United States Patent
Lauper, Jr. et al.

(10) Patent No.: US 7,467,621 B2
(45) Date of Patent: Dec. 23, 2008

(54) ENGINE AND METHOD FOR OPERATING AN ENGINE

(75) Inventors: John Christian Lauper, Jr., East Peoria, IL (US); Martin Leo Willi, Dunlap, IL (US); Balamurugesh Thirunavukarasu, Peoria, IL (US); Weidong Gong, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/589,870

(22) Filed: Oct. 31, 2006

(65) Prior Publication Data
US 2008/0098995 A1 May 1, 2008

(51) Int. Cl.
*F02B 43/00* (2006.01)
(52) U.S. Cl. ...................................... 123/527
(58) Field of Classification Search ............... 123/3, 123/1 A, DIG. 12, 527, 575, 585
See application file for complete search history.

(56) References Cited

U.S. PATENT DOCUMENTS

| | | | |
|---|---|---|---|
| 4,340,013 A * | 7/1982 | Lindstrom | 123/3 |
| 4,442,801 A * | 4/1984 | Glynn et al. | 123/3 |
| 5,408,957 A | 4/1995 | Crowley | |
| 2005/0229872 A1 * | 10/2005 | Lange | 123/3 |

FOREIGN PATENT DOCUMENTS

| | | |
|---|---|---|
| CA | 2 539 711 A1 | 6/2006 |
| EP | 1 344 918 A2 | 9/2003 |
| JP | 59-54747 | 3/1984 |
| WO | WO 97/36103 | 10/1997 |

OTHER PUBLICATIONS

PCT International Search Report; Applicant Ref. No. 06-436; International Appln. No. PCT/US2007/016677; Filing Date: Jul. 25, 2007; Applicant: Caterpillar Inc.

* cited by examiner

*Primary Examiner*—Stephen K. Cronin
*Assistant Examiner*—Hyder Ali
(74) *Attorney, Agent, or Firm*—Finnegan, Henderson, Farabow, Garrett & Dunner

(57) ABSTRACT

A method of operating an engine is provided. The method may include supplying a combustible combination of reactants to a combustion chamber of the engine, which may include supplying a first hydrocarbon fuel, hydrogen fuel, and a second hydrocarbon fuel to the combustion chamber. Supplying the second hydrocarbon fuel to the combustion chamber may include at least one of supplying at least a portion of the second hydrocarbon fuel from an outlet port that discharges into an intake system of the engine and supplying at least a portion of the second hydrocarbon fuel from an outlet port that discharges into the combustion chamber. Additionally, the method may include combusting the combustible combination of reactants in the combustion chamber.

29 Claims, 2 Drawing Sheets

ENGINE AND METHOD FOR OPERATING AN ENGINE

GOVERNMENT RIGHTS

This invention was made with Government support under the terms of Contract No. DE-FC26-01CH11079 awarded by the Department of Energy. The Government may have certain rights in this invention.

TECHNICAL FIELD

The present disclosure relates to engines and, more particularly, to engines that run on a combination of multiple types of fuel.

BACKGROUND

Many engines produce power by combusting hydrocarbon fuel. Such engines may produce undesirable emissions, including oxides of nitrogen ($NO_x$). The air/fuel ratio used by an engine combusting hydrocarbon fuel may affect the quantity of $NO_x$ produced by the engine. Generally, the leaner the air/fuel ratio an engine combusting hydrocarbon fuel uses, the less $NO_x$ emissions the engine will produce. Unfortunately, some fuels, such as natural gas, may combust less readily at leaner air/fuel ratios, which may decrease the likelihood of the engine consistently combusting the fuel successfully (i.e. not misfiring).

U.S. Pat. No. 6,397,790 to Collier, Jr. ("the '790 patent") discloses a method of fueling an engine that involves directing natural gas through a reformer to reform at least part of the natural gas into hydrogen and carbon monoxide before supplying it to the engine. The '790 patent discloses mixing the hydrogen, carbon monoxide, and any unreformed methane that exit the reformer with air and supplying the mixture to the engine. The '790 patent discloses that the hydrogen and carbon monoxide in the reformed natural gas help prevent the engine from misfiring.

Although the '790 patent discloses fueling an engine at least partially with reformed natural gas that includes hydrogen and carbon monoxide to help prevent the engine from misfiring, certain disadvantages persist. Additionally, reforming natural gas to form hydrogen and carbon monoxide requires energy that could otherwise serve other valuable purposes. Accordingly, in some applications and/or circumstances, preventing an engine from misfiring exclusively with the method taught by the '790 patent may consume an undesirable amount of energy reforming the natural gas.

The engine and methods of the present disclosure solve one or more of the problems set forth above.

SUMMARY OF THE INVENTION

One disclosed embodiment relates to a method of operating an engine. The method may include supplying a combustible combination of reactants to a combustion chamber of the engine, which may include supplying a first hydrocarbon fuel, hydrogen fuel, and a second hydrocarbon fuel to the combustion chamber. Supplying the second hydrocarbon fuel to the combustion chamber may include at least one of supplying at least a portion of the second hydrocarbon fuel from an outlet port that discharges into an intake system of the engine and supplying at least a portion of the second hydrocarbon fuel from an outlet port that discharges into the combustion chamber. Additionally, the method may include combusting the combustible combination of reactants in the combustion chamber.

Another embodiment relates to an engine. The engine may include a fuel system that supplies a first hydrocarbon fuel, hydrogen fuel, and a second hydrocarbon fuel. The engine may also include a housing with a combustion chamber wherein the engine combusts a combustible mixture of reactants that includes at least a portion of the first hydrocarbon fuel supplied by the fuel system, at least a portion of the hydrogen fuel supplied by the fuel system, and at least a portion of the second hydrocarbon fuel supplied by the fuel system.

A further embodiment relates to a method of operating an engine. The method may include supplying a combustible combination of reactants to a combustion chamber of the engine, which may include supplying natural gas, hydrogen fuel, and a second hydrocarbon fuel to the combustion chamber. Supplying the second hydrocarbon fuel to the combustion chamber may include at least one of supplying at least a portion of the second hydrocarbon fuel from an outlet port that discharges into an intake system of the engine and supplying at least a portion of the second hydrocarbon fuel from an outlet port that discharges into the combustion chamber. The auxiliary hydrocarbon fuel may include at least one of diesel fuel, crude oil, lubricating oil, and an emulsion of oil and water. The method may also include combusting the combustible combination of reactants in the combustion chamber to drive a working member of the engine.

DETAILED DESCRIPTION

Figure 1:
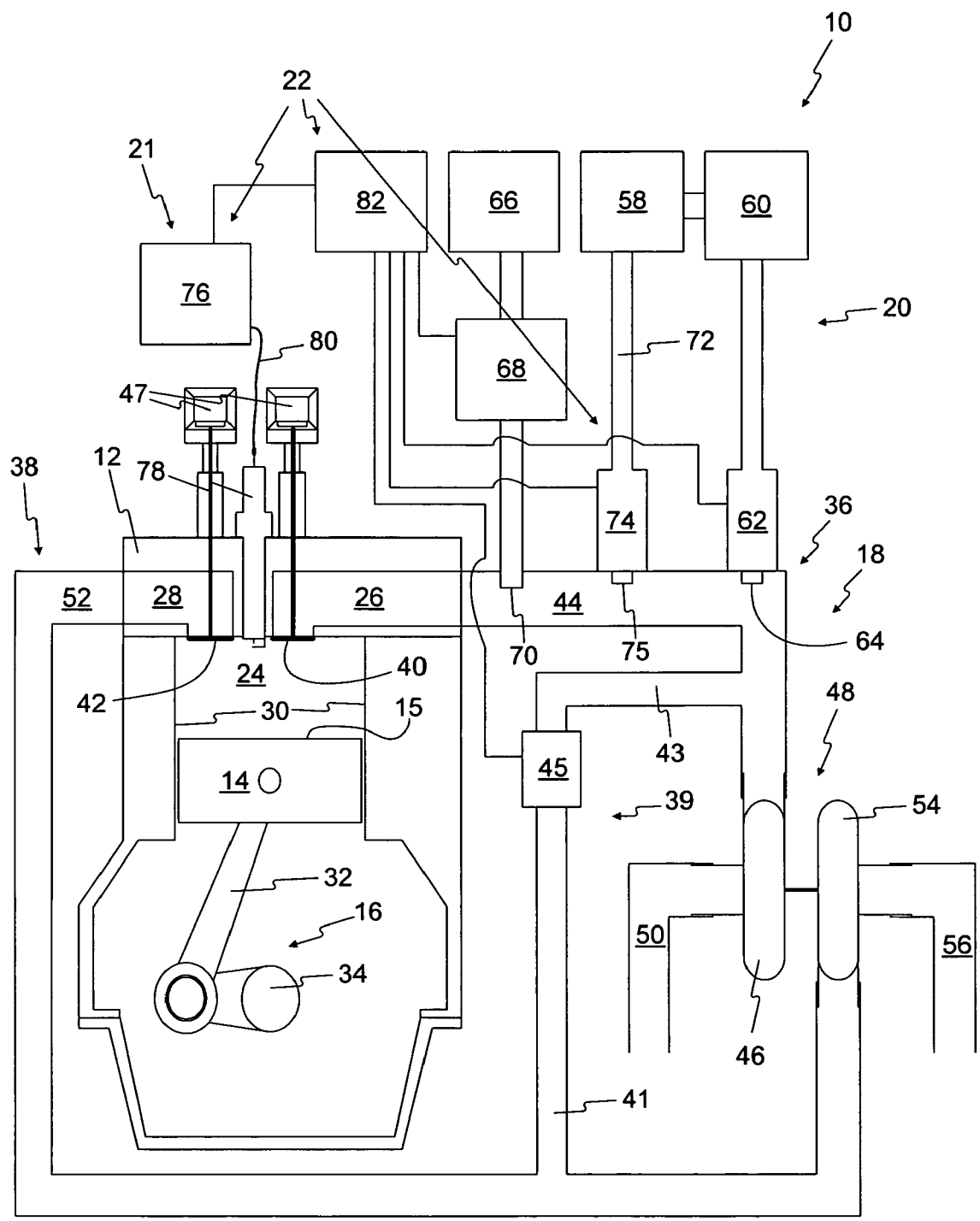
FIG. 1 is a schematic illustration of one embodiment of an engine according to the present disclosure.

FIG. 1 illustrates an engine 10 according to the present disclosure. Engine 10 may include a housing 12, a working member 14, a power-transfer system 16, an aspiration system 18, a fuel system 20, an ignition system 21, and engine controls 22.

Housing 12 may have a combustion chamber 24. Combustion chamber 24 may include a large cavity disposed adjacent working member 24. Additionally, in some embodiments, combustion chamber 24 may include other cavities extending from the large cavity disposed adjacent working member 14, such as one or more "precombustion chambers." Housing 12 may, in some embodiments, include a channel 30, such as a cylinder, extending away from combustion chamber 24. Additionally, housing 12 may include an intake passage 26 and an exhaust passage 28 extending from combustion chamber 24 to the exterior of housing 12. Housing 12 may include multiple pieces fastened together, as shown in FIG. 1, or housing 12 may have a one-piece construction.

Working member 14 and power-transfer system 16 may be supported at least partially in housing 12. Working member 14 and power-transfer system 16 may include any types of components configured to mechanically extract power from combustion in combustion chamber 24 and transfer that power to a load connected to power-transfer system 16. As FIG. 1 shows, in some embodiments, working member 14 may be a piston disposed in channel 30, and power-transfer system 16 may include a connecting rod 32 and crankshaft 34 connected to working member 14.

In some embodiments, working member 14 may have a shape that creates relatively little turbulence in combustion chamber 24 as working member 14 moves. For example, as FIG. 1 shows, a face 15 of working member 14 disposed adjacent combustion chamber 24 may have a substantially flat shape, which may generate relatively little turbulence in combustion chamber 24. Additionally, face 15 of working member 14 may have a convex shape extending into combustion chamber 24 or a relatively shallow concave shape extending away from combustion chamber 24, which shapes may also generate relatively little turbulence in combustion chamber 24. As is discussed in more detail below, in some embodiments, engine 10 may produce power in a manner that involves using working member 14 to compress the contents of combustion chamber 24 during a compression phase. In some embodiments, working member 14 and combustion chamber 24 may have shapes such that, during such a compression phase, gas velocities in combustion chamber 24 do not exceed about three meters per second in directions perpendicular to the direction that working member 14 is moving.

The general configuration of engine 10 is not limited to that shown in FIG. 1. In addition to combustion chamber 24 and working member 14, engine 10 may include additional combustion chambers and working members. Additionally, engine 10 may be a type of engine having a significantly different configuration of housing 12, working member 14, and power-transfer system 16. For example, engine 10 may be a Wankel-type rotary engine, a sliding-vane-type engine, a turbine, or any other type of engine with any type of working member configured to mechanically extract power from combustion in combustion chamber 24. Additionally, in some embodiments, engine 10 may omit power-transfer system 16 and transfer power directly from working member 14 to a load connected thereto.

Aspiration system 18 may include an intake system 36 for directing air (and, in some cases, one or more other substances) to combustion chamber 24 and an exhaust system 38 for directing combustion gases away from combustion chamber 24. Intake system 36 may include intake passage 26 and various components for directing air to intake passage 26. For example, as FIG. 1 shows, intake system 36 may include a passage 44, a compressor unit 46 of a turbocharger 48, and a passage 50 connected in series with intake passage 26. Exhaust system 38 may include exhaust passage 28 and various components for directing combusted gases away from exhaust passage 28. FIG. 1 shows an example of exhaust system 38 that includes a passage 52, a turbine unit 54 of turbocharger 48, and a passage 56 connected in series with exhaust passage 28.

Aspiration system 18 may also include various provisions for controlling flow between combustion chamber 24, intake system 36, and exhaust system 38. For example, aspiration system 18 may include an intake valve 40 for controlling flow between combustion chamber 24 and intake system 36, an exhaust valve 42 for controlling flow between combustion chamber 24 and exhaust system 38, and a valve-control system 47 for controlling intake valve 40 and exhaust valve 42.

In addition to intake system 36 and exhaust system 38, aspiration system 18 may include an exhaust-gas-recirculation (EGR) system 39. EGR system 39 may include any components operable to direct combustion gases discharged from combustion chamber 24 and/or other combustion chambers of engine 10 back into combustion chamber 24 and/or other combustion chambers of engine 10. For example, EGR system 39 may include passages 41, 43, and an exhaust-gas-recirculation (EGR) valve 45 connected between exhaust system 38 and intake system 36.

Aspiration system 18 is not limited to the configuration shown in FIG. 1. For example, intake system 36 may omit one or more of the components shown in FIG. 1 and/or include components not shown in FIG. 1, including, but not limited to, manifolds, plenums, throttle valves, filters, additional compressor units, other types of superchargers, and heat exchangers. Similarly, exhaust system 38 may omit one or more of the components shown in FIG. 1 and/or include components not shown in FIG. 1, including, but not limited to, manifolds, plenums, exhaust-treatment devices, and mufflers.

Fuel system 20 may be any type of system configured to supply fuel for engine 10 to combust. Fuel system 20 may include provisions for supplying a first hydrocarbon fuel for engine 10 to combust. For example, fuel system 20 may include a fuel source 58 that supplies the first hydrocarbon fuel, a fuel line 72, and a valve 74 connected to one another. As FIG. 1 shows, in some embodiments, an outlet port 75 of valve 74 may be disposed in intake system 36 so that valve 74 may discharge the first hydrocarbon fuel from fuel source 58 into intake system 36. In some embodiments, fuel source 58 may supply natural gas or another gaseous fuel. Alternatively, fuel source 58 may supply another type of hydrocarbon fuel, including, but not limited to, gasoline, ethanol, and methanol.

Fuel system 20 may also include provisions for supplying hydrogen fuel. As used herein, "hydrogen fuel" refers to any fluid that contains hydrogen gas or hydrogen liquid. In some embodiments, fuel system 20 may include a reformer 60 that receives hydrocarbon fuel and reforms it to produce hydrogen fuel. As FIG. 1 shows, in some embodiments, reformer 60 may connect to fuel source 58 so that reformer 60 may receive hydrocarbon fuel from fuel source 58 and supply reformed hydrocarbon fuel that includes hydrogen and one or more other substances, such as carbon monoxide. Reformer 60 may use any type of reforming process effective to generate hydrogen and one or more other substances from hydrocarbon fuel, including, but not limited to, steam reforming, cepox reforming, and reforming the hydrocarbon fuel by compressing it.

Fuel system 20 may include various provisions for metering and delivering the hydrogen fuel generated by reformer 60. In some embodiments, fuel system 20 may include a valve 62 with an outlet port 64 disposed in intake system 36 for metering and delivering the reformed hydrocarbon fuel.

Fuel system 20 may also include provisions for supplying a second hydrocarbon fuel for engine 10 to combust with the first hydrocarbon fuel and the hydrogen fuel it supplies. For example, fuel system 20 may include a fuel source 66 that supplies the second hydrocarbon fuel to a pump 68 that pumps the second hydrocarbon fuel through an outlet port 70. As FIG. 1 shows, in some embodiments, outlet port 70 may be disposed in intake system 36. In some embodiments, fuel system 20 may actively meter the amount of the second hydrocarbon fuel supplied. Fuel system 20 may do so in various ways. In some embodiments, pump 68 may be a variable-speed and/or variable-displacement pump, which may enable fuel system 20 to actively meter the amount of the second hydrocarbon fuel supplied by controlling the output of pump 68.

The second hydrocarbon fuel may be various types of hydrocarbon fuel. In some embodiments, the second hydrocarbon fuel may include relatively long-chain hydrocarbon molecules that will break down to form radicals at pressures and temperatures that occur in combustion chamber 24 during a compression phase, as is discussed below. For example, the second hydrocarbon fuel may be diesel fuel, crude oil, lubricating oil, an emulsion of oil and water, or some combination thereof. Additionally, the cetane number of the second hydrocarbon fuel may exceed the cetane number of the first hydrocarbon fuel. In some embodiments, the second hydrocarbon fuel may have a cetane number that exceeds the cetane number of the first hydrocarbon fuel by at least about 40 points.

Fuel system 20 is not limited to the configuration shown in FIG. 1. For example, fuel system 20 may include provisions different from those shown in FIG. 1 for actively metering one or more of the fuels it supplies, including, but not limited to, fuel injectors and carburetors. Additionally, in some embodiments, fuel system 20 may only passively meter one or more of the fuels it supplies, such as by directing one or more of the fuels through a flow path with flow resistance that results in a desirable flow rate of the fuel. Furthermore, rather than receiving natural gas from fuel source 58 and reforming it to provide hydrogen fuel, reformer 60 may receive another type of hydrocarbon fuel from some other fuel source and reform it to provide hydrogen fuel. Additionally, fuel system 20 may include a fuel source that supplies hydrogen fuel without reforming hydrocarbon fuel. Moreover, in addition to, or in place of, discharging fuel at the points shown in FIG. 1, fuel system 20 may discharge fuel at other points, such as other points in intake system 36 and/or directly into combustion chamber 24.

Additionally, fuel system 20 may include provisions other than those shown in FIG. 1 for supplying the second hydrocarbon fuel. For example, in some embodiments, fuel system 20 may include one or more outlet ports that receive lubricating oil from a lubrication system (not shown) of engine 10 and discharge that lubricating oil into intake system 36 or combustion chamber 24 so that it may mix with other fluids flowing to and/or disposed in combustion chamber 24. Of course, in some such embodiments, engine 10 may have such outlet ports and one or more places where lubricating oil may enter intake system 36 and/or combustion chamber 24 as a result of normal leakage of lubricating oil. For example, in some embodiments, in addition to one or more such outlet ports discharging lubricating oil into intake system 36, normal leakage of lubricating oil may occur from a gap around the stem of intake valve 40 into intake system 36. Additionally, fuel system 20 may include provisions for actively metering the flow of lubricating oil from such outlet ports, including, but not limited to, one or more valves and/or variable-output pumps.

Ignition system 21 may include any components operable to generate spark in combustion chamber 24 to ignite its contents. For example, ignition system 21 may include an ignition module 76 and a spark plug 78 connected by a high-tension line 80. Ignition module 76 may include any components operable to generate high voltage in high-tension line 80 at appropriate times to cause spark plug 78 to generate spark in combustion chamber 24 to ignite its contents.

Engine controls 22 may include any components operable to control one or more aspects of the operation of engine 10. In some embodiments, engine controls 22 may include fuel system 20, ignition system 21, EGR valve 45, and a controller 82. Controller 82 may be any type of information-processing device. Controller 82 may include one or more microprocessors (not shown) and one or more memory devices (not shown). Controller 82 may be operatively connected to fuel system 20 and ignition system 21 so that controller 82 may control them. For example, controller 82 may be operatively connected to valve 62, pump 68, and valve 74 so that controller 82 can control the quantities of the various fuels supplied for engine 10 to combust. Additionally, controller 82 may be operatively connected to ignition module 76 so that controller 82 can control one or more aspects of the operation of ignition system 21. Furthermore, controller 82 may be operatively connected to EGR valve 45 so that controller 82 may control whether and at what rate combustion gas flows through EGR system 39.

Controller 82 may also be connected to various other components (not shown) that provide controller 82 with information about various operating conditions of engine 10. For example, engine controls 22 may include sensors (not shown) providing controller 82 with information such as the position and/or speed of crankshaft 34, the temperature of engine 10, the temperature of exhaust gas from engine 10, the temperature and/or pressure of gas in intake system 36, and/or various other aspects of the operation of engine 10.

Engine controls 22 are not limited to the configuration shown in FIG. 1. In some embodiments, engine controls 22 may include multiple controllers, rather than a single controller 82. For example, engine controls 22 may include separate, dedicated controllers for ignition system 21 and fuel system 20. Engine controls 22 may also include various other types of controls in addition to, or in place of, controller 82, including, but not limited to, hardwired electrical control circuits, hydraulic controls, pneumatic controls, and/or some combination thereof.

Figure 2:
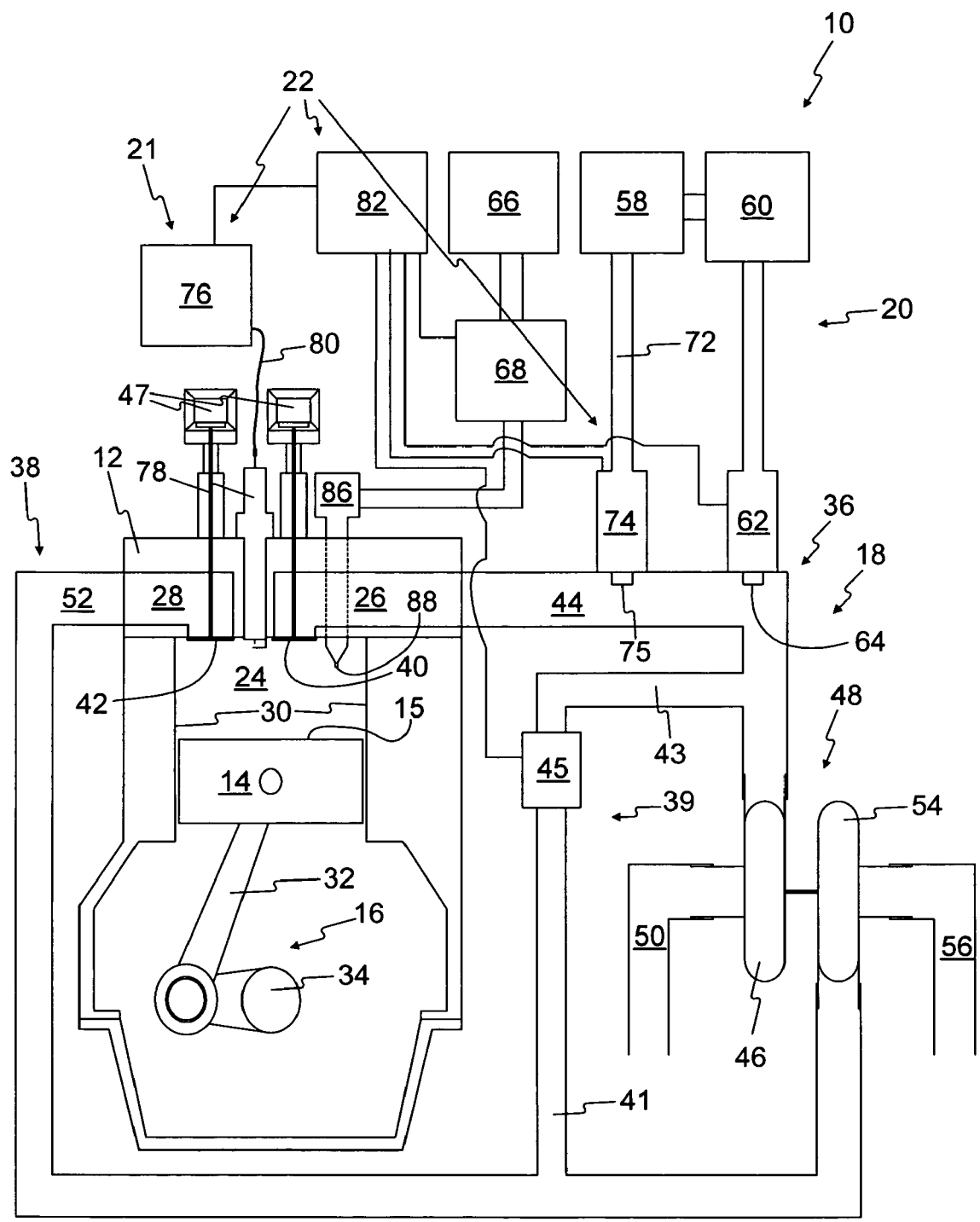
FIG. 2 is a schematic illustration of another embodiment of an engine according to the present disclosure.

FIG. 2 shows another embodiment of engine 10 according to the present disclosure. The embodiment of engine 10 shown in FIG. 2 may replicate the embodiment shown in FIG. 1 in most respects. However, in the embodiment shown in FIG. 2, fuel system 20 may use a fuel injector 86 with an outlet port 88 disposed in combustion chamber 24 to discharge the second hydrocarbon fuel directly into combustion chamber 24. Controller 82 may be operatively connected to fuel injector 86 so that controller 82 may control injection of the second hydrocarbon fuel into combustion chamber 24.

INDUSTRIAL APPLICABILITY

Engine 10 may have application wherever power is required to perform one or more tasks. Engine 10 may produce power by using fuel system 20 and intake system 36 to supply a combustible combination of fuel and one or more other reactants to combustion chamber 24 and combusting the combustible combination of reactants in combustion chamber 24.

Fuel system 20 and intake system 36 may supply the combustible combination of fuel and one or more other combustible reactants to combustion chamber 24 in various ways. For example, during operation of the embodiment shown in FIG. 1, intake system 36 may deliver to combustion chamber 24 a mixture that includes air, the first hydrocarbon fuel discharged from outlet port 75, the hydrogen fuel discharged from outlet port 64, and the second hydrocarbon fuel discharged from outlet port 70. During operation of the embodiment shown in FIG. 2, fuel injector 86 may discharge the second hydrocarbon fuel from outlet port 88 into combustion chamber 24 to mix with the first hydrocarbon fuel, hydrogen fuel, and air supplied to combustion chamber 24 by intake system 36. In addition to the substances mentioned above, intake system 36 may also supply various other substances to combustion chamber 24, such as combustion gas from EGR system 39. Similarly, fuel system 20 may supply other fuels in addition to those mentioned above.

Engine controls 22 may control the aggregate quantity of fuel supplied in various manners. In some embodiments and/or circumstances, fuel system 20 may control the aggregate quantity of fuel supplied to provide substantially stoichiometric combustion in combustion chamber 24. In other embodiments and/or circumstances, fuel system 20 may control the aggregate quantity of fuel supplied to cause lean combustion in combustion chamber 24.

Engine controls 22 may also cause fuel system 20 to supply the different fuels in various proportions. Fuel system 20 may supply a relatively small quantity of the second hydrocarbon fuel compared to the other fuels. Fuel system 20 may, for example, control the amount of the second hydrocarbon fuel supplied in a manner that maintains the heating value of the second hydrocarbon fuel supplied to combustion chamber 24 less than about one percent of the aggregate heating value of fuel supplied to combustion chamber 24. Additionally, in some embodiments, fuel system 20 may control the amount of the second hydrocarbon fuel supplied in a manner that maintains the heating value of the second hydrocarbon fuel supplied to combustion chamber 24 higher than about 0.01 percent of the aggregate heating value of fuel supplied to combustion chamber 24. Fuel system 20 may also supply a relatively small quantity of hydrogen fuel (such as reformed hydrocarbon fuel) compared to the amount of the first hydrocarbon fuel supplied. For example, in some embodiments, fuel system 20 may maintain the quantity of hydrogen fuel supplied at an amount that has less than about one fourth of the heating value of the first hydrocarbon fuel supplied.

In some embodiments, engine 10 may compress the combustible combination of fuel and one or more other reactants supplied by fuel system 20 and intake system 36 in a compression phase. For example, with both intake valve 40 and exhaust valve 42 closed, engine 10 may compress the combustible combination of reactants in combustion chamber 24 with working member 14. As engine 10 compresses the combustible combination of reactants during the compression phase, the second hydrocarbon fuel supplied by fuel system 20 may break down into radicals.

After taking the combustible combination of reactants through at least a portion of the compression phase, engine 10 may combust the combustible combination of reactants in combustion chamber 24 to drive working member 14. Engine 10 may employ various methods to initiate combustion in combustion chamber 24. For example, ignition system 21 may ignite the combustible combination of reactants by generating spark in combustion chamber 24 with spark plug 78. Alternatively, engine 10 may employ compression ignition to ignite the combustible combination of reactants in combustion chamber 24.

Operating engine 10 on a combination of the first hydrocarbon fuel, hydrogen fuel, and the second hydrocarbon fuel, as discussed above, may provide certain performance advantages. The second hydrocarbon fuel supplied by fuel system 20 may assist the hydrogen fuel in promoting consistent, complete combustion of the first hydrocarbon fuel in lean air/fuel mixtures. It is contemplated that the second hydrocarbon fuel may promote successful combustion of the natural gas at least partially by cracking during the compression phase and, thereby, forming radicals that readily combust to release heat that helps ignite the natural gas. It is also contemplated that the more the cetane number of the second hydrocarbon fuel exceeds the cetane number of the first hydrocarbon fuel, the more the second hydrocarbon fuel may promote consistent, complete combustion of the first hydrocarbon fuel. Additionally, it appears from testing that supplying a combination of hydrogen fuel and the second hydrocarbon fuel, as discussed above, may synergistically increase combustion efficiency (the percentage of fuel that successfully combusts).

These benefits of the disclosed embodiments may allow engine 10 to achieve a favorable combination of low $NO_x$ emissions, high power output, and high efficiency. For any given lean air/fuel ratio, consistent combustion of the first hydrocarbon fuel may require less hydrogen fuel if engine 10 uses the second hydrocarbon fuel to help promote combustion. As a result, using the second hydrocarbon fuel to help promote combustion of the first hydrocarbon fuel may allow engine 10 to achieve a desired level of $NO_x$ emissions with less hydrogen fuel. Using less hydrogen fuel to achieve the desired level of $NO_x$ emissions may improve the power output of engine 10. Additionally, in embodiments where fuel system 20 supplies the hydrogen fuel by reforming hydrocarbon fuel, using less hydrogen fuel to achieve a desired level of $NO_x$ emissions may reduce the amount of energy used to reform hydrocarbon fuel, thereby allowing that energy to serve other purposes.

Additionally, for any given quantity of hydrogen fuel supplied by fuel system 20, supplementing the hydrogen fuel with the second hydrocarbon fuel may ensure successful combustion of natural gas at a leaner air/fuel ratio. Accordingly, using the second hydrocarbon fuel to help promote combustion of the first hydrocarbon fuel may allow engine 10 to achieve reduced $NO_x$ emissions without diminishing power output or using more energy to reform hydrocarbon fuel into hydrogen fuel.

Additionally, using a combination of hydrogen fuel and the second hydrocarbon fuel may reduce the need to generate turbulence in combustion chamber 24 to promote successful combustion of the first hydrocarbon fuel. Engine 10 may capitalize on this by employing a working member 14 and combustion chamber 24 with shapes that do not generate high turbulence in combustion chamber 24. Keeping turbulence in combustion chamber 24 low may promote efficiency by suppressing the amount of heat that gases in combustion chamber 24 transfer to surrounding surfaces by convection.

It will be apparent to those skilled in the art that various modifications and variations can be made in the engine and methods without departing from the scope of the disclosure. Other embodiments of the disclosed engine and methods will be apparent to those skilled in the art from consideration of the specification and practice of the engine and methods disclosed herein. It is intended that the specification and examples be considered as exemplary only, with a true scope of the disclosure being indicated by the following claims and their equivalents.

What is claimed is:

1. A method of operating an engine, including:
   supplying a combustible combination of reactants to a combustion chamber of the engine, including
      supplying a first hydrocarbon fuel to the combustion chamber,
      supplying hydrogen fuel to the combustion chamber, and
      supplying a second hydrocarbon fuel to the combustion chamber, including supplying at least a portion of the second hydrocarbon fuel from a fuel system of the engine into an intake system of the engine and through at least a portion of the intake system into the combustion chamber, the second hydrocarbon fuel supplied to the combustion chamber having an aggregate heat energy content less than an aggregate heat energy content of the first hydrocarbon fuel supplied to the combustion chamber; and
   combusting the combustible combination of reactants in the combustion chamber with the second hydrocarbon fuel acting as an ignition source for the first hydrocarbon fuel.

2. The method of claim 1, wherein the aggregate heat energy content of the second hydrocarbon fuel supplied to the combustion chamber is less than about one percent of an aggregate heat energy content of the combustible combination of reactants supplied to the combustion chamber.

3. The method of claim 2, wherein the second hydrocarbon fuel includes at least one of diesel fuel, crude oil, lubricating oil, and an emulsion of oil and water.

4. The method of claim 1, wherein the aggregate heat energy content of the second hydrocarbon fuel supplied to the combustion chamber is at least about 0.01 percent of an aggregate heat energy content of the combustible combination of reactants supplied to the combustion chamber.

5. The method of claim 1, wherein the second hydrocarbon fuel includes at least one of diesel fuel, crude oil, lubricating oil, and an emulsion of oil and water.

6. The method of claim 1, wherein the second hydrocarbon fuel has a cetane number higher than a cetane number of the first hydrocarbon fuel.

7. The method of claim 1, wherein the second hydrocarbon fuel has a cetane number that exceeds a cetane number of the first hydrocarbon fuel by at least about 40 points.

8. The method of claim 1, wherein the first hydrocarbon fuel is natural gas.

9. The method of claim 1, further including:
compressing the combustible combination of reactants in a compression phase; and
wherein the second hydrocarbon fuel includes a hydrocarbon that breaks down into radicals in the compression phase.

10. The method of claim 1, wherein supplying the hydrogen fuel from the fuel system to the combustion chamber includes reforming hydrocarbon fuel to generate at least a portion of the hydrogen fuel and supplying at least a portion of the generated hydrogen fuel to the combustion chamber.

11. The method of claim 1, wherein the hydrogen fuel supplied to the combustion chamber has an aggregate heat energy content of less than about one fourth of the aggregate heat energy content of the first hydrocarbon fuel supplied to the combustion chamber.

12. The method of claim 1, wherein combusting the combustible combination of reactants in the combustion chamber includes igniting the combustible combination of reactants with spark.

13. The method of claim 1, wherein supplying the first hydrocarbon fuel to the combustion chamber includes supplying at least a portion of the first hydrocarbon fuel from the fuel system into the intake system and through at least a portion of the intake system to the combustion chamber.

14. An engine, comprising:
a fuel system that supplies natural gas, hydrogen fuel, and a second hydrocarbon fuel, wherein the fuel system supplies the second hydrocarbon fuel separately from the hydrogen fuel; and
a housing with a combustion chamber wherein the engine combusts a combustible combination of reactants that includes at least a portion of the natural gas supplied by the fuel system, at least a portion of the hydrogen fuel supplied by the fuel system, and at least a portion of the second hydrocarbon fuel supplied by the fuel system, wherein the natural gas and the second hydrocarbon fuel in the combustible combination of reactants are at least partially intermixed in the combustion chamber prior to combustion, and an aggregate heat energy content of the natural gas in the combustible combination of reactants is greater than an aggregate heat energy content of the second hydrocarbon fuel in the combustible combination of reactants.

15. The engine of claim 14, further including:
an intake system connected to the combustion chamber; and
wherein the fuel system supplies at least a portion of the second hydrocarbon fuel through an outlet port that discharges into the intake system, and the intake system directs at least a portion of the second hydrocarbon fuel discharged from the outlet port to the combustion chamber.

16. The engine of claim 15, wherein the fuel system supplies at least a portion of the first hydrocarbon fuel into the intake system, and the intake system directs at least a portion of the first hydrocarbon fuel to the combustion chamber.

17. The engine of claim 14, wherein the fuel system supplies at least a portion of the second hydrocarbon fuel through an outlet port that discharges into the combustion chamber.

18. The engine of claim 14, wherein the aggregate heat energy content of the second hydrocarbon fuel supplied to the combustion chamber is less than about one percent of an aggregate heat energy content of the combustible combination of reactants.

19. The engine of claim 18, further including:
an ignition system; and
wherein the engine initiates combustion of the combustible combination of reactants in the combustion chamber by generating spark in the combustion chamber with the ignition system.

20. The engine of claim 14, further including:
a piston disposed adjacent the combustion chamber;
wherein the engine compresses the combustible combination of reactants with the piston during a compression phase; and
the piston and combustion chamber have shapes such that, during the compression phase, gas velocities in the combustion chamber do not exceed about three meters per second in directions perpendicular to the direction the piston is moving.

21. The engine of claim 14, wherein:
the engine compresses the combustible combination of reactants in a compression phase; and
the second hydrocarbon fuel includes a hydrocarbon that breaks down into radicals in the compression phase.

22. The engine of claim 14, wherein the second hydrocarbon fuel has a cetane number higher than a cetane number of the first hydrocarbon fuel.

23. The engine of claim 14, wherein the second hydrocarbon fuel has a cetane number that exceeds a cetane number of the first hydrocarbon fuel by at least about 40 points.

24. The engine of claim 14, further including:
an intake system connected to the combustion chamber; and
wherein the fuel system supplies at least a portion of the first hydrocarbon fuel into the intake system, and the intake system directs at least a portion of the first hydrocarbon fuel to the combustion chamber.

25. A method of operating an engine, including:
supplying a combustible combination of reactants to a combustion chamber of the engine, including
supplying natural gas to the combustion chamber at least in part by supplying natural gas from a fuel system of the engine into an intake system of the engine and through at least a portion of the intake system to the combustion chamber, supplying hydrogen fuel to the combustion chamber, and supplying a second hydrocarbon fuel to the combustion chamber, including at least one of supplying at least a portion of the second hydrocarbon fuel from an outlet port that discharges into the intake system of the engine and supplying at least a portion of the second hydrocarbon fuel from an outlet port that discharges into the combustion chamber, wherein the second hydrocarbon fuel is supplied to the combustion chamber in a quantity such that a heating value of the second hydrocarbon fuel supplied to the combustion chamber is less than a heating value of the natural gas supplied to the combustion chamber, and wherein the second hydrocarbon fuel includes at least one of diesel fuel, crude oil, lubricating oil, and an emulsion of oil and water; and combusting the combustible combination of reactants in the combustion chamber to drive a working member of the engine.

26. The method of claim 25, wherein the quantity of the second hydrocarbon fuel supplied to the combustion chamber is such that the heating value of the second hydrocarbon fuel in the combustion chamber is less than about one percent of an aggregate heating value of fuel in the combustible combination of reactants.

27. The method of claim 25, wherein the hydrogen fuel is supplied to the combustion chamber in a quantity such that the hydrogen fuel supplied to the combustion chamber has a heating value less than about one fourth of the heating value of the natural gas supplied to the combustion chamber.

28. The method of claim 25, wherein combusting the combustible combination of reactants in the combustion chamber includes igniting the combustible combination of reactants by generating spark in the combustion chamber.

29. The method of claim 25, wherein supplying the second hydrocarbon fuel to the combustion chamber includes supplying at least a portion of the second hydrocarbon fuel from the fuel system into the intake system and through at least a portion of the intake system to the combustion chamber.

* * * * *